United States Patent [19]

Stammler

[11] Patent Number: 4,985,705
[45] Date of Patent: Jan. 15, 1991

[54] METHOD AND APPARATUS FOR COMPILING AND EVALUATING LOCAL TRAFFIC DATA

[75] Inventor: Walter Stammler, Ulm, Fed. Rep. of Germany

[73] Assignee: Telefunken Systemtechnik GmbH, Ulm, Fed. Rep. of Germany

[21] Appl. No.: 328,891

[22] Filed: Mar. 27, 1989

[30] Foreign Application Priority Data

Mar. 26, 1988 [DE] Fed. Rep. of Germany ....... 3810357

[51] Int. Cl.$^5$ .................... G01S 13/91; G08G 1/081
[52] U.S. Cl. .................................. 342/69; 342/192; 342/195; 340/910
[58] Field of Search ............... 342/69, 115, 192, 195, 342/196; 340/909, 910, 924

[56] References Cited

U.S. PATENT DOCUMENTS

| | | | |
|---|---|---|---|
| 3,181,156 | 4/1965 | Ruppersberg et al. | 342/69 |
| 4,023,017 | 5/1977 | Ceseri | 342/69 |
| 4,057,756 | 11/1977 | Ley et al. | 324/77 B |

OTHER PUBLICATIONS

Skolnik, M. I., "Introduction to Radar Systems", 2nd Edition, 1980, McGraw-Hill, pp. 70–81.
Electronic Design, "Newscope Speeders Beware The Cops Can Take You Out", vol. 25, Dec. 20, 1977, p. 19.
Alan V. Oppenheim and Ronald W. Schafter, "Digital Signal Processing", Prentice-Hall Inc., Englewood Cliffs, N.J., 1975, pp. 541–548.
Walter Stammler and Helmut Brehm, "Correlation Estimation for Spherically Invariant Speech Model Signals", in MELECON 85, vol. II, Digital Signal Processing; Elsevier Science Publ., North Holland, 1985, pp. 127–130.
Douglas F. Elliott, "Handbook of Digital Signal Processing", Academic Press Inc., 1987, pp. 600–604.
"International Electrotechnical Commission Technical Committee No. 57: Telecontrol, Teleprotection and Associated Telecommunications for Electric Power Systems", Part 5-2: Link Transmission Procedures Revision 6, Oct. 1987.
Sloan D. Robertson, "Recent Advances in Finline Circuits", IRE Trans. on MTT-4, 1956, pp. 263–267.

Primary Examiner—Gilberto Barrón, Jr.
Attorney, Agent, or Firm—Spencer & Frank

[57] ABSTRACT

A method for compiling and evaluating local traffic data based on a real time evaluation of Doppler echoes on a digital basis, wherein initially the frequency spectrum of the Doppler echo is formed, then the frequency of the maximum amplitude in this spectrum is identified, and the speed of the vehicle is determined from this frequency. The length of the vehicle can also be determined from the speed of the vehicle and from the Doppler echo signal duration. An apparatus for implementing the method includes a millimeter wavelength radar sensor, a transmission unit, and an evaluation unit operating with digital signal processing.

31 Claims, 5 Drawing Sheets

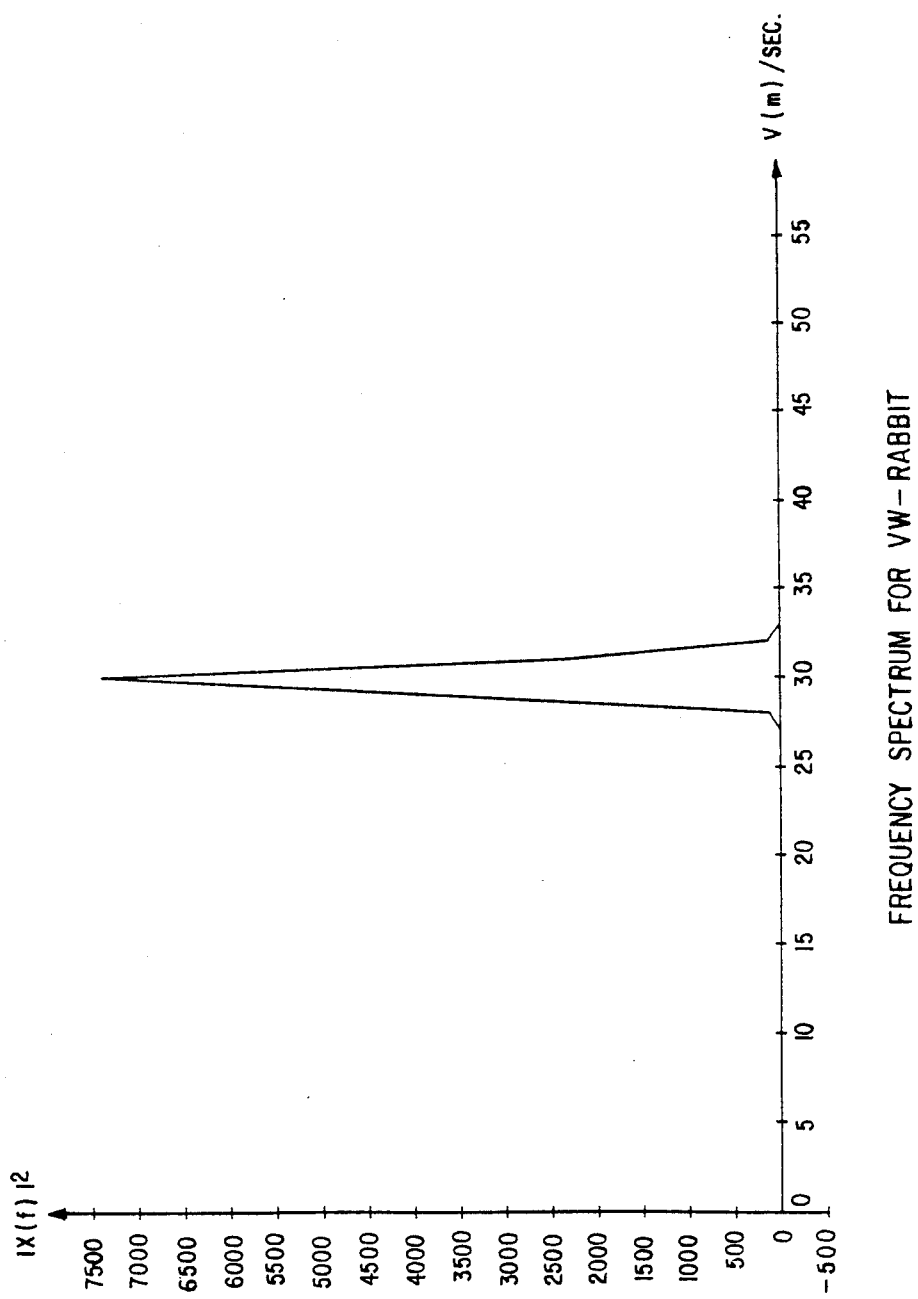

METHOD AND APPARATUS FOR COMPILING AND EVALUATING LOCAL TRAFFIC DATA

CROSS REFERENCE TO RELATED APPLICATION

This application claims the priority of application Ser. No. P 38 10 357.5, filed Mar. 26th, 1988 in the Federal Republic of Germany, the subject matter of which is incorporated herein by reference.

BACKGROUND OF THE INVENTION

The present invention relates to a method of compiling and evaluating local traffic data, and to an apparatus for implementing the method. More particularly, the invention is directed to a method and apparatus of the type wherein a radar sensor is connected to an evaluation device by way of a transmission device; wherein the radar sensor emits a continuous signal at a constant frequency and amplitude and at a fixed, vertical angle of incidence $\alpha$ and, as soon as a moving object passes the radar beam with a speed component in the direction of the beam, receives part of the signal reflected at the object and shifted in frequency due to the Doppler effect; wherein the two signals are mixed to generate a first output signal at the difference frequency; and wherein the evaluation unit includes a pre-connected lowpass filter in order to avoid spectral convolutions, an analog-digital converter, and a subsequently connected digital signal processing device.

Methods and apparatuses of this type are employed, for example, to monitor and control or statistically compile information on the traffic flow on limited-access highways, inter-urban highways, and/or in intra-city traffic. They can also be used for track-bound traffic, such as for railroads, and for automatic warehousing or in industrial processing, for example to monitor and control automatic production lines.

SUMMARY OF THE INVENTION

It is an object of the present invention to provide a method of the above-mentioned type with which it is possible to compile and evaluate such traffic data as accurately and quickly as possible.

This object can be attained by forming the frequency spectrum of an output signal, which results when the radar signal and reflected radar signal are mixed, in a digital signal processing device, by determining the frequency at the maximum amplitude in this spectrum, and deriving the speed of the object from this frequency.

BRIEF DESCRIPTION OF THE DRAWINGS

FIG. 8 is a graph illustrating an example of a frequency spectrum obtained for a "VW-Rabbit."

DESCRIPTION OF THE PREFERRED EMBODIMENT

Figure 1:
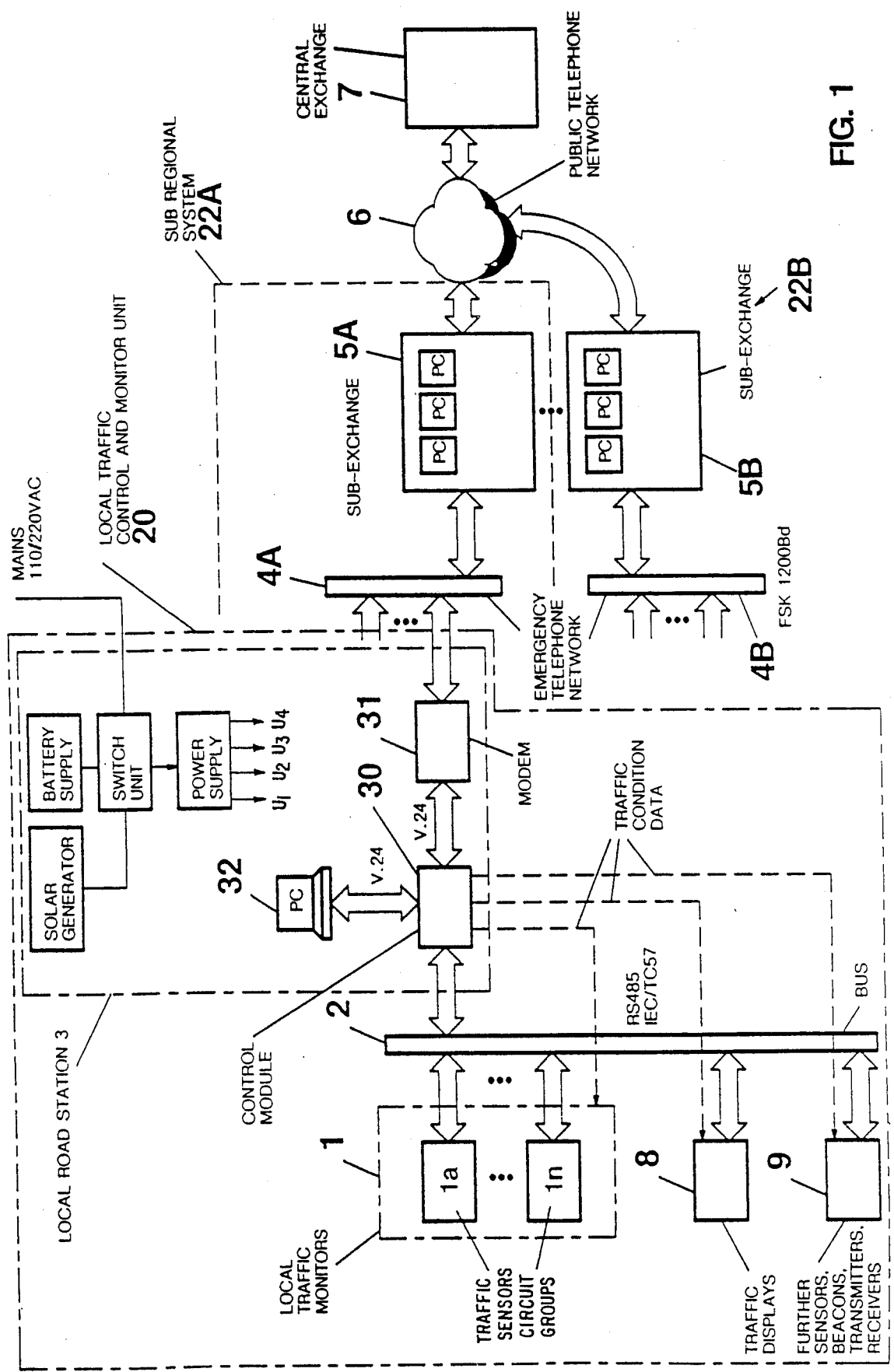
FIG. 1 is a schematic block diagram of a super-regional system for monitoring and controlling the traffic flow on limited-access highways.

A regional system for monitoring and controlling traffic flow, for example on limited-access highways, is shown in FIG. 1 and includes a local traffic control and monitor system 20. System 20 has local traffic monitors 1, which are distributed at selected points of the highway network (for example, in the region of highway intersections or triangles or in the region of entrance and exit ramps) and which monitor the local traffic flow there. Preferably, this monitoring takes place separately for each traffic lane. The monitoring devices may be of a conventional type, such as induction loops, but preferably traffic sensor circuit groups 1a through 1n according to the invention are employed. A traffic sensor circuit group will be described in more detail later. In addition to their monitoring function, in principle traffic monitors 1 may be located adjacent traffic displays 8 so that information can be conveyed to drivers.

The monitors 1 stationed close to the local road station 3 of the limited-access highway are connected, via a data transmitting device such as a bus 2 (RS 485) operating with a protocol according to IEC/TC57 (International Electrotechnical Commission/Traffic Code 57), with the local road station 3. Local road station 3 is responsible for these monitors and is composed essentially of a control module 30 which is connected, for example via a V.24 interface, with a modem 31. Control module 30 may include a computer. For configuration or test purposes, control module 30 can be connected, via a further V.24 interface, to a terminal or a computer 32 (e.g. a personal computer).

Bus 2 may be additionally connected with variable traffic displays 8 which display, for example on the basis of the traffic information transmitted from the responsible local road station 3 via bus 2, the official traffic signals adapted to the traffic situation. Traffic displays 8 may be traditional green-yellow-red stop lights, and/or more sophisticated displays which provide other information for drivers. Moreover, further sensors, beacons, transmitters and/or receivers 9 may be connected to bus 2 so as to compile meteorological data for this subregion of the limited-access highway network and report it to road station 3. Sensors 9 may, for example, provide information about visibility, temperature, wind velocity, precipitation, snow, ice, wetness, etc. Further sensors may include sensors which monitor the traffic and/or transmit actual information to a receiver positioned in each vehicle and/or receive data from the transmitter of a vehicle. The millimeter wave Doppler sensor presented here is the basis for such a combination of traffic monitor and transmitter/receiver. The emitted continuous wave signal may be coded to transmit e.g. actual traffic information to the receiver in a vehicle passing by.

In a higher-order stage, sub-regional system 22A includes the local system 20 shown in FIG. 1 along with other local systems (not explicitly shown). Sub-regional system 22A also includes a further data transmission device such as an already-installed limited-access highway emergency telephone network 4A and a regional sub-exchange 5A. The road stations 3 of the individual local systems for the sub-region of the limited-access highway network served by sub-regional system 22A are connected via network 4A to the regional sub-exchange 5A. Sub-exchange 5A, in the next-higher or regional stage, is connected via a further data transmission device such as the public telephone network 6 with a central exchange 7. It will be apparent that the regional system also includes other sub-regional systems in addition to sub-regional system 22A. For example, sub-regional system 22B, which is also connected to central exchange 7 by public telephone network 6, includes regional sub-exchange 5B, highway emergency telephone network 4B, and a plurality of local systems (not shown) corresponding to local system 20.

This hierarchial division into a plurality of stages ensures that, upon malfunction of individual components or transmission lines in the system, the other components are able to continue operating without interference or with only a slight adverse effect.

Such a super-regional system for monitoring and control accomplishes essentially the following:

(1) monitor traffic flow (average speed, number, and type of vehicles) and meteorological conditions (visibility, temperature, wind velocity, precipitation/snow, ice/wetness, etc.), particularly at critical points of the limited-access highway network;

(2) immediately transmit the compiled data to the responsible regional sub-exchange (e.g., 5A), for example by way of the emergency highway telephone network (e.g., 4A) installed parallel to the highways themselves;

(3) cause the regional sub-exchange (e.g., 5A) to adapt the changeable traffic displays 8 in the respective local system (e.g., 20) for the limited-access highway network on the basis of the evaluation of these data, and possibly to transmit additional messages and information for drivers if the traffic displays 8 are appropriately configured. For example, in addition to telling drivers when to stop or go, traffic displays 8 may include signs (not illustrated) with individual panels which can be illuminated to provide messages regarding traffic congestion, construction, accidents, etc., via the systems generating the traffic signals. Moreover roadside beacons or transmitters connected to bus 2 (FIG. 2) may transmit these data to a receiver in a vehicle passing by.

In addition, the regional sub-exchanges (e.g., 5A) may forward up-to-date traffic reports to local radio stations (not shown) which broadcast the reports without delay to traffic participants (that is, drivers). In a modified system, such information might be transmitted directly to drivers by way of displays (not shown) associated directly with traffic monitors 1.

Advisably, communications procedures between the individual parts of the system and the protocols employed are defined in conformance with IEC/TC57. The power supply for the local road station and for the local traffic monitors described here may be based either on the 110 V/220 V AC mains-supply, or on a rechargeable battery (e.g., for mobile applications, such as intra-urban traffic counting), or on a solar generator. The central power supply provides the various radar sensors (FIG. 2) with a supply voltage $U_4$ (FIG. 3), via cable. The supply voltage $U_4$ is preferably a low DC voltage.

Figure 2:
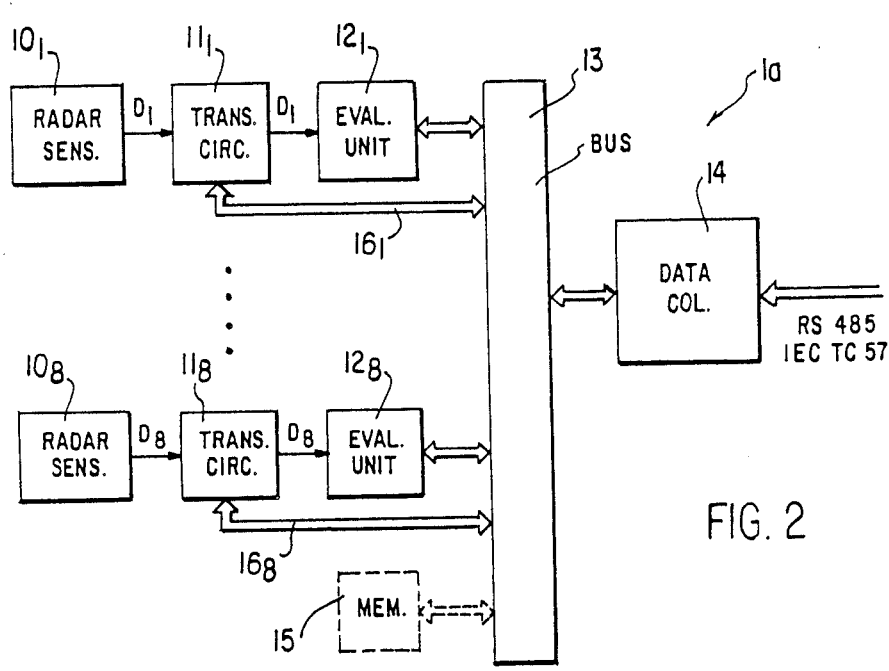
FIG. 2 is a schematic block diagram of a traffic sensor circuit group having a plurality of traffic measurement branch circuits, each of which responds to traffic in a respective lane.

FIG. 2 shows the traffic sensor signal group $1a$ according to the invention for locally monitoring traffic flow. The traffic sensor signal group $1a$ includes a plurality of individual traffic measurement branch circuits (branch circuit $10_1$, $11_1$, $12_1$, to branch circuit $10_8$, $11_8$, $12_8$) according to the invention, each for implementing the inventive method, with indices 1 and 8 being exemplary indications of eight such individual branch circuits. Each one of these individual traffic measurement branch circuits monitors one traffic lane. The top branch circuit (for example) shown in FIG. 2 is composed of:

(1) a radar sensor $10_1$ (also see FIG. 4) attached at a height h, for example at a pole on the side of the limited-access highway or to an overhead traffic sign bridge. The radar sensor $10_1$ is mounted at an angle of incidence $\alpha$ with respect to the vertical and is directed down onto the vehicular objects;

(2) a transmission circuit $11_1$ which carries the current supply lines (not shown) for radar sensor $10_1$ and which transmits output signal $D_1$ to an evaluation unit $12_1$; and (3) an evaluation unit $12_1$ which evaluates the output signal $D_1$ of radar sensor $10_1$ and determines therefrom the up-to-date traffic data (speed, average speed, vehicle length, spacing between vehicles, vehicle type, etc.).

In the illustrated embodiment, eight such individual branch circuits have their outputs connected to a common, standard ECB bus 13 (the respective transmission circuits $11_1$ to $11_8$ are also connected directly to bus 13). Bus 13 is connected with a data collector 14, for example a microcomputer. In addition to storing the data, data collector 14 primarily serves to control and monitor the eight individual branch circuits (data monitoring, error checking, etc.) and to communicate with the control module 30 (see FIG. 1) of the associated road station 3 (see FIG. 1). Additionally, the regional sub-exchanges (e.g., reference number 5A in FIG. 1) receive instructions from the responsible control module 3 to send new parameter values and so forth to data collector 14, which analyzes this information and forwards it accordingly to one, several, or all of the individual branch circuits $10_1$, $11_1$, $12_1$, . . . , $10_8$, $11_8$, $12_8$. The communication between the computers involved (5A, 7, 14, 30) is based on the IEC/TC57 standard (see "International Electrotechnical Commission Technical Committee No. 57: Telecontrol, Teleprotection and Associated Telecommunications for Electric Power Systems," Part 5-2: LINK Transmission Procedures Revision 6, October 1987).

In a further embodiment (not illustrated), locally or centrally generated information can be transmitted via the individual branch circuits $10_1$, $11_1$, $12_1$, . . . , $10_8$, $11_8$, $12_8$ directly to drivers by additionally including the traffic displays 8 in the branch circuits. Such information, for example, may include information regarding traffic conditions, possible detours, danger spots, construction sites, etc.

Furthermore, an additional memory 15 may be connected to ECB bus 13 for storage of the data generated in the individual branch circuits. This is of particular advantage if a traffic sensor circuit group $1a$ is not part of a regional system but is employed as an independent, autonomous system, for example, for counting the traffic at an intra-city intersection.

Figure 3:
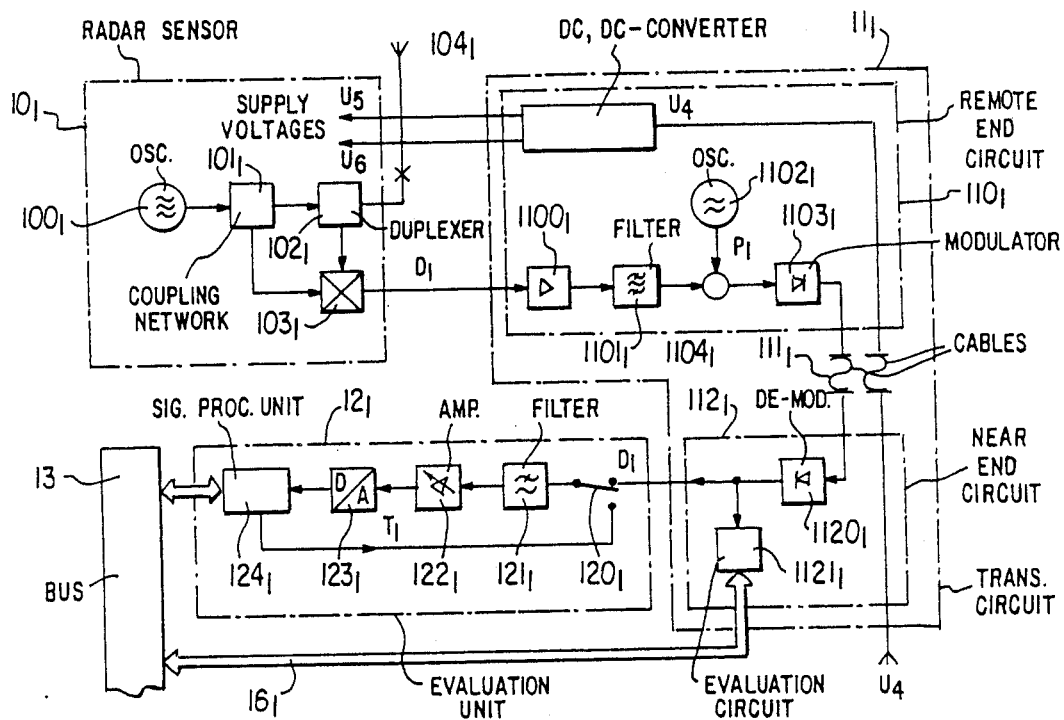
FIG. 3 is a detailed block circuit diagram of a traffic measurement branch circuit which can be employed in the circuit of FIG. 2.

FIG. 3 is a block circuit diagram showing in detail the basic structure of (for example) the traffic measurement branch circuit which includes radar sensor $10_1$, transmission circuit $11_1$, and evaluation unit $12_1$. As will be discussed in more detail later, transmission circuit $11_1$ includes a remote end circuit $110_1$ which is located near radar sensor $10_1$ and a near end circuit $112_1$ which is located near evaluation unit $12_1$.

The radar sensor $10_1$ is a millimeter wavelength transceiver composed of a local oscillator $100_1$, a coupling network $101_1$, a duplexer $102_1$, a mixer $103_1$, and a transmit/receive antenna $104_1$. The duplexer operates according to the principle explained by Sloan D. Robertson in "*Recent Advances in Finline Circuits,*" IRE Trans. on MTT-4, 1956, pp. 263–267.

Via antenna $104_1$, radar sensor $10_1$ transmits a continuous unmodulated sinusoidal millimeter wavelength signal generated by local oscillator $100_1$ at a frequency $f_0 = 61.25$ GHz. Antenna $104_1$ also receives part of the signals reflected by vehicles passing the radar beam. Due to the Doppler effect, these signals are shifted in frequency. By directly mixing such a reflected signal with a part of the transmitted signal that has been coupled out by way of coupling network $101_1$, an output signal $D_1$ at the difference frequency is generated by the mixer $103_1$. This is the so-called Doppler echo or Doppler signal.

The frequency $f_0 = 61.25$ GHz makes it possible to combine, in a particularly advantageous manner, high absorption by the atmosphere (20 dB/km) with the compactness of millimeter wavelength components. Thus the entire radar sensor $10_1$ together with the remote end circuit $110_1$ of the transmission circuit $11_1$ fits into a cube-shaped housing (see FIG. 4) having edge lengths of about 15 cm. FIG. 3 indicates that the transmission circuit 11 includes the transmission of the supply voltage $U_4$ from the central power supply (FIG. 1) to the radar sensor and to the remote end transmission circuit. A DC/DC-converter generates the required voltages $U_5$ and $U_6$ from the DC voltage $U_4$. Preferably $U_4$ is 24 V to employ rechargeable batteries in the case of mobile applications. The voltage $U_4$ is provided over the same cable, where the signals are transmitted as well.

Figure 5:
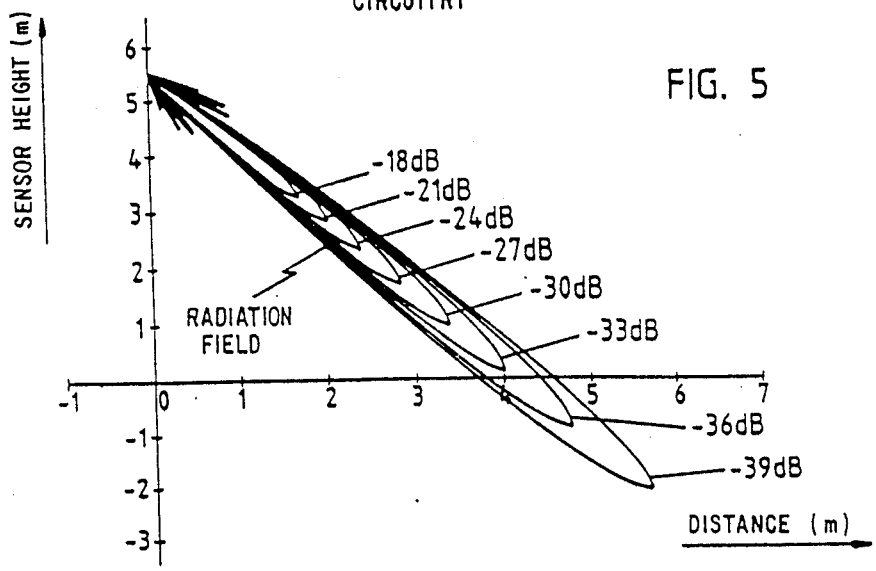
FIG. 5 is a vertical sectional view of the radiation field of the radar sensor in FIG. 4.

In order to avoid clutter effects due to rain or snow, transmission and reception are polarized in different directions. The transmitting power is less than 10 mW. The beam characteristic preferably has a horizontal aperture angle of 3° and a vertical aperture angle of 13° (see FIG. 5, which illustrates a vertical sectional view of the radiation field of the radar sensor $10_1$).

Figure 4:
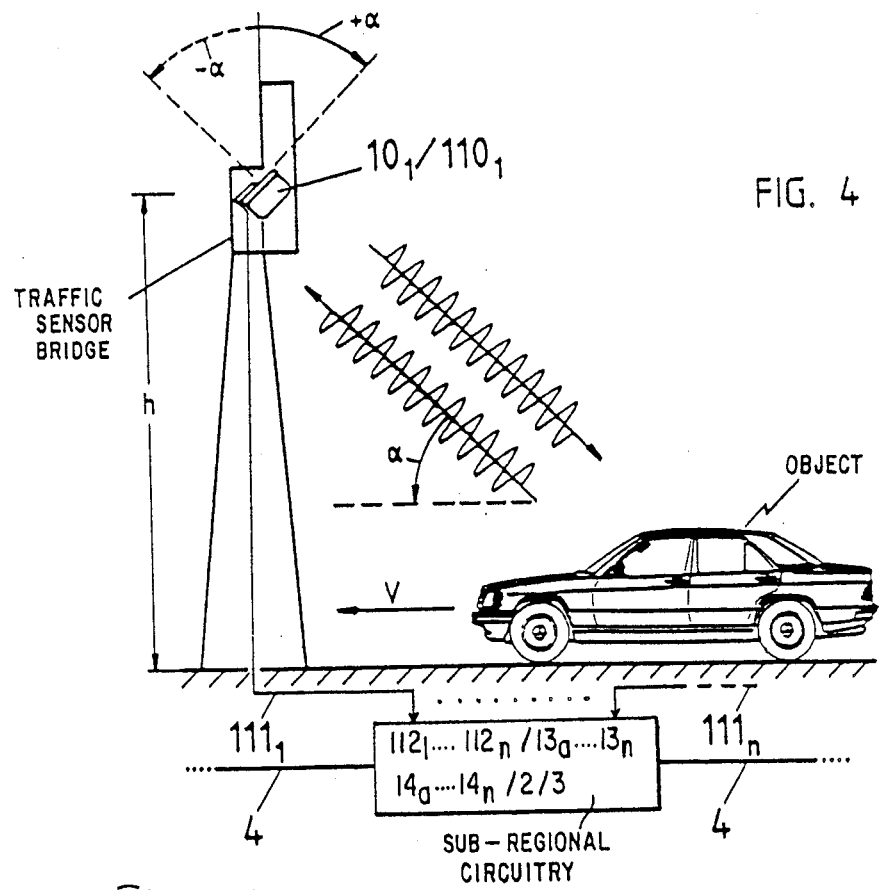
FIG. 4 is a side view illustrating a road with a vehicle, an overhead radar sensor, and associated circuitry.

As is shown in FIG. 4, the radar sensor $10_1$ is disposed, for example, on a traffic signal bridge at a height h (for example, h≈5.5 m) above the lane to be monitored. The radiation field of radar sensor $10_1$ is oriented at an angle $\alpha$ (measured with respect to the vertical) toward the associated traffic lane. A vehicle, marked "object" in FIG. 4, traveling at a speed v reflects part of the radiation emanating from radar sensor $10_1$ in the direction of the sensor. In the ideal case, the frequency f of the Doppler echo will be the following:

$$f = \frac{f_0 \cdot 2v \cdot \cos\alpha}{c} \quad (1)$$

where c is the speed of light. According to the laws of geometry, the angle of incidence $\alpha$ here corresponds to the angle between the radar beam and the speed vector v of the vehicle passing the radar beam.

In practice, however, deviations from the ideal case described here will occur. For example, such deviations may be present in the form of measurable frequency shifts which are not based on the Doppler effect, or in the form of amplitude fluctuations (down to complete absorption of the signal by the vehicles passing the radar beam). These effects are caused primarily by the overlapping of signals reflected at different locations of the vehicle where geometry and reflection characteristic differ, or by the finite expanse of the radar radiation field in the direction of movement of the vehicles.

For the selection of the angle of incidence $\alpha$, two effects must be considered which cannot be optimized simultaneously. High accuracy in the vehicle length measurement and a reliable separation of successive vehicles are realized with large angles of incidence $\alpha$ (extreme case: the radiation field is oriented perpendicularly downwardly). However, the width of the frequency spectrum of a Doppler echo (and thus the inaccuracy of the frequency measurement) generally increases as $\alpha$ increases. According to Equation (1), this results in the accuracy of the determination of the vehicle speed being reduced when the angle of incidence $\alpha$ is selected to be large.

Optimization of the two contradictory effects results in an angle of incidence of about 53°. Here, the radiation field of radar sensor $10_1$ may either be directed—as shown in FIG. 4—toward the front of the vehicles (a positive $\alpha$ value) or toward the rear of the vehicles (a negative $\alpha$ value, shown with dashed lines in FIG. 4). Due to different degrees of shading (that is, different signal strengths in the reflected radar signals and different shadow lengths at the beginning or end of the vehicle) by different vehicles, different errors in the vehicle length measurement result for these two possible orientations.

Transmission circuit $11_1$ in FIG. 3 is composed of the remote end circuit $110_1$ on the side of the radar sensor $10_1$ (which, in FIG. 4, is accommodated in a common housing with radar sensor $10_1$), the near end circuit $112_1$, and a transmission cable $111_1$ which connects the remote end circuit $110_1$ to the near end circuit $112_1$ (see also FIG. 4). In this way it is possible to employ a single local road station 3 (FIGS. 1 and 4) to monitor even expansive local areas of the limited-access highway network, in which more than eight lanes must be monitored and which thus require the use of more than eight devices according to the present invention. Examples of such expansive local areas of the highway network include highway intersections or triangles or large-area entrance and exit ramps. Preferably, transmission unit $11_1$ also furnishes the direct operating voltage (typically +24 V) required to operate radar sensor $10_1$ and supplied by the local control module 30.

In remote end circuit $110_1$, the Doppler echo $D_1$ is amplified (reference number $1100_1$) and bandpass filtered (reference number $1101_1$). To minimize the influence of attenuation, noise, and/or network hum in the transmission of the Doppler echo, the amplified and filtered signal to be transmitted is frequency modulated by a modulator $1103_1$. After transmission via cable $111_1$, the signal is demodulated with the aid of a demodulator $1120_1$ in near end circuit $112_1$ on the side of the evaluation unit $12_1$.

Additionally, in a preferred embodiment, a pilot signal $P_1$, for example at a frequency f = 16 kHz is generated by an oscillator $1102_1$ in remote end circuit $110_1$ and is added (reference number $1104_1$) to the Doppler echoes $D_1$. In near end circuit $112_1$ of transmission device $11_1$, on the side of the evaluation unit $12_1$, there is disposed a corresponding evaluation circuit $1121_1$. Evaluation circuit $1121_1$ checks for the correct transmission of pilot signal $P_1$ and, in the case of an error, reports such an error to data collector 14 via a direct connection $16_1$ to the associated ECB bus 13. Preferably, pilot signal $P_1$ is coupled to the noise signal level generated by radar sensor $10_1$ so that, if sensor $10_1$ malfunctions and there thus is no noise signal, no pilot signal $P_1$ is transmitted either, enabling evaluation circuit $1121_1$ to immediately send an error report to data collector 14.

In a preferred embodiment of the invention, the components disposed on the side of the evaluation unit and belonging to four of the eight traffic measurement branch circuits associated with one data collector 14 are combined on a single card (not illustrated).

Finally, evaluation unit $12_1$ of FIG. 3 is composed of an anti-aliasing lowpass filter $121_1$ for the avoidance of spectral aliasing, an analog/digital converter $123_1$, and a digital signal processing unit $124_1$. In a preferred embodiment, analog/digital converter $123_1$ is preceded by a variable gain amplifier $122_1$ whose gain is set so that, in spite of different attachment heights of radar sensors $10_1, \ldots, 10_8$, the Doppler signals can be normalized to a standard height.

Additionally, anti-aliasing lowpass filter $121_1$ is preceded by a switch $120_1$ which makes it possible to feed a test signal $T_1$ into evaluation unit $12_1$ instead of the Doppler echoes $D_1$. The test signal $T_1$ is preferably generated by digital signal processing unit $124_1$. This signal enables evaluation unit $12_1$ to undergo a self-test. The output of digital signal processing unit $124_1$ is connected with the standard ECB bus 13.

Figure 6:
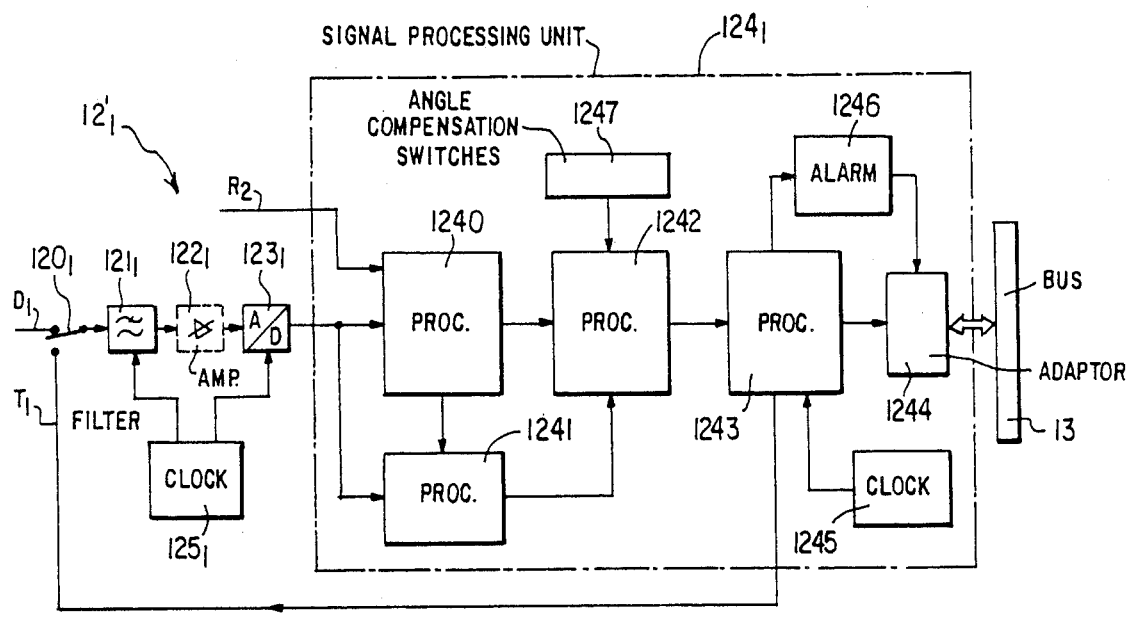
FIG. 6 is a detailed block circuit diagram of an evaluation unit employed in a traffic measurement branch circuit.

Like the evaluation unit $12_1$ shown in FIG. 3, the embodiment of evaluation unit $12_{1'}$ shown in FIG. 6 includes a switch $120_1$ for feeding in the test signal $T_1$ instead of the Doppler echo $D_1$, an anti-aliasing lowpass filter $121_1$, a variable gain amplifier $122_1$, an analog/digital converter $123_1$, and digital signal processing device $124_1$. The lowpass filter $121_1$ of evaluation unit $12_{1'}$ is preferably provided in the form of a digital filter (such as a switch/capacitor filter), and evaluation unit $12_{1'}$ additionally includes a clock pulse generator $125_1$ which is provided to adapt the cut-off frequency of lowpass filter $121_1$ to the existing speed range. Furthermore an additional signal $R_2$ (which will be discussed in more detail later) is fed into digital signal processing device $124_1$. This additional signal is derived from a further Doppler echo $R_1$, as will be discussed, and includes as its information the direction of movement of the vehicles.

Digital signal processing device $124_1$ is composed of four networked digital signal processors 1240–1243 (e.g. NEC 7720) which operate in parallel, an adapter 1244 for connecting the signal processors 1240 to 1243 to standard ECB bus 13, a clock pulse generator 1245 for the generation of a test signal, an alarm generator 1246 for reporting errors, e.g. to a light emitting diode (not illustrated) on the face plate (not illustrated) of the digital signal processing unit $124_1$ and/or to the data collector 14 (FIG. 2), and switches 1247 for compensating the deviation of the actually set angle of incidence $\alpha$ from the optimum angle of incidence of about 53°.

Figure 7:
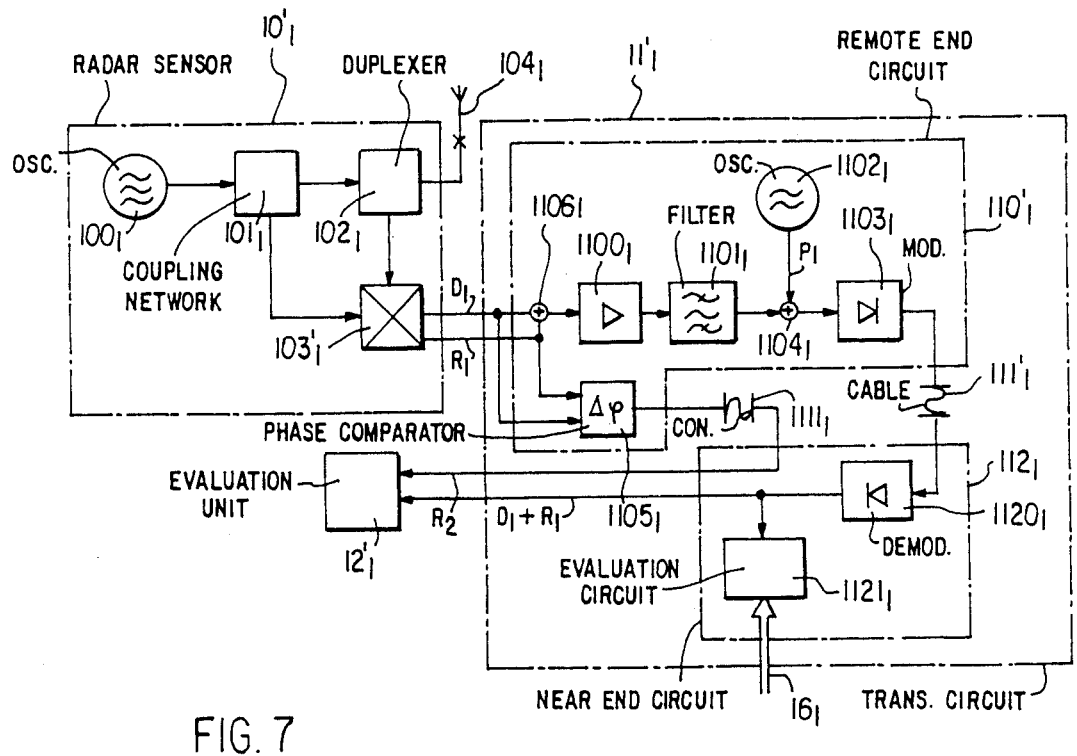
FIG. 7 is a detailed block circuit diagram of another embodiment of a traffic measurement branch circuit which can be employed in the circuit of FIG. 2, and which additionally permits information regarding the direction of movement of the monitored objects to be transmitted and evaluated.

The arrangement according to the invention shown in FIG. 7 differs from the arrangement according to the invention shown in FIG. 3 in that:

(1) the mixer $103_{1'}$ in the radar sensor $10_{1'}$ furnishes two Doppler signals $D_1$ and $R_1$ whose phase position relative to each other provides information about the direction of travel or movement of the object. A method for providing such a mixer has been proposed by Manfred Boheim in "Aktuelle Entwicklungen auf dem Gebiet der Doppler-Sensoren" ["Present-Day Developments in the Field of Doppler Sensors"], Conference Proceedings MIOP 87, Vol. 3, Sect. 9B-4, edited by Network GmbH, Hagenburg, West Germany, 1987; ISBN 3-924 651-09-4. For this purpose, in remote end circuit $110_{1'}$ of transmission circuit $11_{1'}$ the phase of each oscillation of Doppler signal $D_1$ is compared by a phase comparator $1105_1$ with that of $R_1$. The result ("leading" or "trailing") of this phase comparison is coded as a 1-bit signal $R_2$ and transmitted to evaluation unit $12_{1'}$ via an additional conductor $1111_1$ in transmission circuit $11_{1'}$; and (2) The Doppler signal to be transmitted and evaluated is obtained by summation circuit $1106_1$ which adds the two phase shifted Doppler signals $D_1$ and $R_1$ ($D_1+R_1$).

Returning to the basic embodiment shown in FIG. 3 of a traffic measurement branch circuit, the method according to the invention is performed as follows: The (analog) Doppler echo generated by radar sensor $10_1$ is initially amplified by an amplifier $1100_1$ disposed in the remote end circuit $110_1$. The amplified signal is then filtered by a bandpass filter $1101_1$, provided with the pilot signal $P_1$ by an adder $1104_1$, and frequency modulated by modulator $1103_1$. After transmission over cable $111_1$, the frequency modulated signal is demodulated by demodulator $1120_1$ in near end circuit $112_1$. In evaluation unit $12_1$, the demodulated signal is separated by lowpass filter $121_1$ from the remaining signals (e.g. the pilot signal $P_1$) and limited in bandwidth to half the sampling frequency and, after amplification by amplifier $122_1$, is digitized by analog/digital converter $123_1$. The digital signal is then fed into the digital signal processing device $124_1$.

According to the invention, in signal processing unit $124_1$ the frequency spectrum is formed from these digitalized Doppler echoes $D_1$. Then the frequency having the maximum amplitude in this spectrum is determined and, from this frequency, the speed of the vehicle is derived with the aid of Equation (1).

In practice, $f_0=61.25$ GHz, $c=300{,}000$ km/s, and speed $v<207$ km/h produce a frequency range for Doppler echoes $D_1$ from 0 to about 14.25 kHz. According to the sampling theorem, such a frequency range for the Doppler echoes $D_1$ requires a minimum sampling rate of 28.5 kHz (and preferably 32 kHz) for analog/digital converter $123_1$.

The dynamic of the Doppler echo is a function of the distance between the radar sensor and the reflecting object, i.e. the vehicle, and of the effective radar sensitive cross section of the vehicles to be recorded. Typically, a dynamic range of about 60 dB can be expected.

In preferred embodiments of the inventive method, the frequency spectrum is formed either by autocorrelation of Doppler echo $D_1$ with subsequent spectral transformation or by relay correlation of Doppler echo $D_1$ with subsequent spectral transformation and advantageously by direct spectral transformation, preferably by way of a discrete Fourier transformation (DFT), particularly with the use of the fast Fourier transformation method (FFT).

In contrast to conventional methods such as, for example, counting the zero crossings of a Doppler echo or measuring the period duration of several oscillations, the methods employed here ensure that signal intervals having a relatively low signal to noise ratio will not worsen the measuring result. The reason is that a linear (frequency) transformation is performed here, and the actual Doppler frequency is that frequency which has the maximum amplitude in the spectrum. With the aid of Equation (1), the speed of the vehicle can be derived from the frequency having the maximum amplitude in the spectrum.

The computation of the frequency spectrum $|X(e^{j\omega})|^2$ for an input sequence x(n) and for an angular frequency $\omega = 2\pi \cdot f$ can be based either:

(A) on the Fourier transform $$X(e^{j\omega}) = \sum_{n=0}^{N-1} x(n) \cdot e^{-j\omega n} \quad (2)$$

of the real finite length sequence x(n), $0 \leq n \leq n-1$ (this is the so called "periodogram method" [for reference see Alan V. Oppenheim and Ronald W. Schafter, "Digital Signal Processing," Prentice-Hall Inc., Englewood Cliffs, New Jersey, 1975, pp. 541-548] or discreet spectral transformation of the signal), or (B) on the Fourier transform $$I_n(\omega) = \sum_{m=-(N-1)}^{N-1} C_{xx}(m) \cdot e^{-j\omega m} \quad (3)$$

of the biased autocorrelation estimate $$C_{xx}(m) = \frac{1}{N} \sum_{n=0}^{N-|m|-1} x(n) \cdot x(n+m) \quad (4)$$

for $-N + 1 \leq m \leq N - 1$

The relation between $I_N(\omega)$ and $X(e^{j\omega})$ is given by the formula $$I_N(\omega) = \frac{1}{N} |X(e^{j\omega})|^2 \quad (5)$$

(for reference see also Alan V. Oppenheim and Ronald W. Schafer, "Digital Signal Processing"; Prentice-Hall Inc., Englewood Cliffs, N.J., 1975, pp. 541-548).

Instead of an autocorrelation estimate a relay correlation estimate $$d_{xx}(m) = \frac{1}{N} \sum_{n=0}^{N-|m|-1} x(n) \cdot sgn[x(n+m)] \quad (6)$$

may be employed as well. Since the sgn-function assumes the values +1 and −1, the relay correlation merely requires additions and subtractions, however no multiplications. For a wide class of signals it can be shown that $d_{xx}(m)$ is proportional to $c_{xx}(m)$. (For reference see Walter Stammler and Helmut Brehm, "Correlation Estimation for Spherically Invariant Speech Model Signals" in MELECON 85, Volume II, Digital Signal Processing; Elsevier Science Publ., North Holland, 1985, pp. 127-130).

Here the Fourier transformation is performed by means of the Fast Fourier Transform- (FFT-) Algorithm. A computer program for the FFT has been published, e.g., by Douglas F. Elliott, "Handbook of Digital Signal Processing", Academic Press Inc., 1987, pp. 600-604. Since in the case of direct spectral transformation the input data sequence may be rather long compared to the FFT-length N, we need to divide the complete data sequence into K segments of length N. Then for each of K segments a FFT of length N is computed and each of the squared output values is averaged over the segments. This method is called "averaging periodograms" and is described, e.g., by Alan V. Oppenheim and Ronald W. Schafer, "Digital Signal Processing," Prentice-Hall Inc., 1975, pp. 541-548. An example of a frequency spectrum obtained with FFT-length N=128 for a "VW-Rabbit" is shown in FIG. 8.

Preferably, the Fourier analysis is performed with N=128 points, which results in an interval width in the speed range of about 3.6 km/h, that is, in an accuracy in the speed determination of about ±1.8 km/h. In case the actual angle $\alpha$ (see FIG. 4) of the installed radar sensor $10_1$ differs from the optimum angle $\alpha=53°$, the calculated speed must be corrected accordingly (with about 2.3% for a deviation of about 1°). To be able to take this into account, the deviation is advantageously measured after the radar sensor $10_1$ is installed and is compensated by correspondingly setting angle compensation switches 1247 (see FIG. 6), indicating the difference $$\Delta\alpha = \alpha - \tilde{\alpha} \quad (7)$$

between the measured actual angle $\alpha$ and the desired angle $\alpha$. This difference $\Delta\alpha$ is read in by the processing unit 1242, which evaluates a factor $$b = \frac{\cos\alpha}{\cos\tilde{\alpha}} \frac{\cos\alpha}{\cos(\alpha - \Delta\alpha)} \quad (8)$$

necessary to correct the speed value v, obtained from the Doppler frequency f according to equation (1):

$$v = f \frac{c}{f_0 \cdot 2 \cdot \cos\alpha} b = f \cdot \frac{c}{f_0 \cdot 2 \cdot \cos\tilde{\alpha}} \quad (9)$$

As an advantageous feature of the method, the direction of movement of the vehicles can be determined with the aid of the circuitry shown in FIG. 7 by generating an additional Doppler echo $R_1$ which is shifted in phase relative to the first Doppler echo $D_1$. For each period of the two signals, the phase position of the two signals is compared by phase comparator $1105_1$, and the phase position determined for each period is subsequently coded with one bit. Then the direction of movement of the vehicles is derived in digital signal processing device $124_1$ (see FIG. 6) from the succession of the individual bits by signal processor 1240.

Additionally, the method according to the invention serves to determine the beginning and end of individual Doppler echoes. This permits, inter alia, the length of a vehicle to be derived from the speed of the vehicle and from the duration of the Doppler echo connected therewith.

The signal duration measurement is based on a measurement of the envelope of the Doppler signal. The existing energy of the Doppler echoes is determined in a window which shifts over time, and this energy is compared with a first and a second threshold value. If the energy exceeds the first threshold for the first time at a point in time, this is determined and defined to be the beginning of the Doppler echo. If the energy falls below the second threshold at a later point in time, this is determined and defined to be the end of the Doppler echo. If the second threshold is not reached temporarily in the meantime due to unfavorable reflection conditions in the vehicle (no reflection component in the direction of the sensor, complete absorption of the radar radiation by the object, etc.), an advantageous feature of the invention provides that this is not evaluated to be the end of the signal. Moreover, the height of the threshold values may be adapted to the existing noise level (for example, the thresholds are raised if there is heavy rain or snowfall) so as to reduce the number of error detections. Also the two threshold values may be selected to be at different magnitudes.

As has already been mentioned above, it is possible to determine the length of the vehicle from the speed of the vehicle and from the signal duration of the Doppler echo connected therewith; this is done according to the following equation:

$$L = v \cdot T - L_R - L_S \tag{10}$$

Here L represents the length of the vehicle, v represents the speed of the vehicle, and T represents the signal duration of Doppler echo $D_1$. This result considers the finite expanse of the radar spot $L_R$ and the length correction $L_S$ due to shading effects, which may falsify the actual length of the vehicle.

For limousines $L_R + L_S = 0.8$ m was found from statistical evaluations. Here shading effects are almost negligeable. The value of $L_R$ depends of course on the actual antenna diagram. The beam characteristics shown in FIG. 5 (Isolines) confirm a value of 0.7–0.9 m for $L_R$.

For trucks $L_R + L_S$ is chosen as a function of the average signal power SIGPOW. As an example the relation $$L_R + L_S = \begin{cases} C_o + SIGPOW \cdot C_1 & \text{for } SIGPOW < C_3 \\ C_o + C_3 \cdot C_1 & \text{for } SIGPOW > C_3 \end{cases} \tag{11}$$

and with constant values $C_0$, $C_1$, $C_3$ may be used advantageously. This formula considers the fact that for high vehicles (which are recognized by high signal power) shading effects are stronger than for low vehicles.

Due to the previously determined values (v, T, L) and further information (signal energy, statistical parameters for the previous signal curve), it is then possible to classify the signals to reduce error detections (e.g. as a result of heavy rain or snowfall) to a minimum. Clutter due to rain or showfall can be characterized by the following features:

(1) low Doppler frequency and as a result low speed;
(2) short signal duration and as a consequence of (1) and (2) short length of the measured object;
(3) pulse like signal envelopes, i.e. the signal energy occurring in a window exceeds the first threshold several times, but always for a short duration. The maximum length of a level crossing interval is rather small for rain clutter;
(4) the peak value of the frequency spectrum is significantly smaller for rain clutter than for a vehicle.

As an example, a decision for rain or snowfall will be made if the following logical function, derived for the features given above, is true:

(SPEPEAK<C1)∪

((VELOC<C2)∩(LENGTH<C3))∪

((VELOC<C6)∩(LENGTH≧C3)∩ (SPEPEAK<C4)∩(LCINT<C5))∪

((C6≦VELOC<C2)∩(C3≦LENGTH<C7)∩ (SPEPEAK<C8))

with constant thresholds

C6<C2

C8<C4

C3<C7 and with the abbreviations
SPEPEAK—Peak value of the frequency spectrum;
LCINT—Duration of the maximum level crossing interval;
VELOC—Speed of the object; and
LENGTH—Length of the object.

To be able, in a further step, to make a distinction between a truck and an automobile on the basis of the length of the vehicle and/or the signal amplitude, it is of advantage to compensate for the different installation and attachment heights of the individual radar sensors. With reference to FIG. 3, for example, such compensation can be accomplished with the aid of amplifier $122_1$ in evaluation unit $12_1$. The calculations can then be performed on the basis of a standardized installation height.

To improve the signal evaluation, the input data for the fast Fourier transformation process can be additionally weighted with a window function, for example in order to give greater consideration in the calculation to the restarting points lying in the center region of the window than the restarting points along its edges ("windowing").

Experimental results from limited-access highways have shown that the standard deviation of the error of calculated vehicle lengths is about 45 cm and the standard deviation of the error in the calculated vehicle speeds for speeds around 100 km/h is about 1.7 km/h.

In detail, the four signal processors 1240 to 1243 of FIG. 6 perform the following functions:

(a) Signal processor 1240:
 (1) evaluation of the noise level;
 (2) measurement of the envelope of the Doppler echo: and
 (3) determination of the direction of movement of the vehicle.
(b) Signal processor 1241:
 (1) fast Fourier transformation (FFT) of the Doppler echo; and
 (2) "windowing."
(c) Signal processor 1242:
 (1) spectral averaging of the frequency spectra obtained by way of the FFT;
 (2) determination of the vehicle speed;
 (3) determination of the vehicle length;
 (4) suppression of clutter due to rain and/or snow; and (5) compensation of the deviation of the set angle of incidence α from the optimum angle of incidence (α=53°).

(d) Signal processor 1243:
(1) classification of the vehicles;
(2) average speed of the vehicles; and
(3) generation of test functions and evaluation of self-test of the digital signal processing device.

Compared to conventional methods (induction loops, etc.), the use of a radar sensor (e.g., $10_1$) results in the following advantages:
(1) installation is possible without work on the roadway (compared to loops);
(2) longer service life since there is no wear due to traffic,
(3) mobile compilation of traffic data is possible (attachment to whip masts and radiation emanating from the side of the roadway, etc.);
(4) use is possible in construction sites, particularly if, in the course of the construction work, the road covering must be destroyed or the traffic lanes moved;
(5) no tuning during operation ("start-up measurements") and no later readjustment is necessary; and
(6) it is possible to expand the system for communication with the vehicles.

The completely digital realization of the Doppler signal evaluation process results in the following advantages:
(1) very high accuracy in the determination of the vehicle speed;
(2) reliable signal classification by inclusion of time, frequency, and amplitude criteria;
(3) reproducibility of the results;
(4) no adjustment work whatsoever due to aging or temperature drifts, and thus reduced maintenance costs;
(5) inclusion of intelligent monitoring and control functions;
(6) simple adaptation to special uses by modification of the sampling rate and changing the evaluation or output programs. No changes in hardware should be necessary; most likely, only a change in the software will be needed; and
(7) the possibility of taking over control parameters or decision criteria from superior offices.

Additionally, the following advantages result from the selected and described system configuration, composed of a radar sensor, a transmission unit, a digital signal processing unit, and a data collector:
(1) usability as an isolated system (with local memory) or as part of a network;
(2) great distances from the road station to the attachment of the radar sensor are permissible; that is, the number of road stations 3 required for a network can be reduced; and
(3) monitoring and control of all system components from the data collector 14.

It is understood that the present invention can be expanded and modified, and can be adapted to its different applications without this having to be described in greater detail here.

For example, it is possible to create different signal processor configuration with different signal processors to solve the same problems as does the configuration shown in FIG. 6.

It is also possible, in order to suppress clutter and/or other noise signals, to evaluate Doppler echoes at regular intervals where these Doppler echoes do not originate due to reflections from vehicles and to subtract the resulting frequency spectra from the frequency spectra which were obtained on the basis of reflections from vehicles.

Finally, it is possible to store the time sequences of the associated Doppler echoes (patterns) in an additional memory (not shown) of digital signal processing device $124_1$, and to compare the measured time sequences of the Doppler echoes with these stored patterns. This would make it possible to identify the vehicle type, and to reduce the number of error detections due to temporary breaks in the Doppler echo during the signal duration.

It will be understood that the above description of the present invention is susceptible to various modifications, changes, and adaptations, and the same are intended to be comprehended within the meaning and range of equivalents of the appended claims.

What I claim is:

1. A method of locally compiling and evaluating traffic data, comprising the steps of:
   (a) using a radar sensor to emit a continuous signal at a constant frequency and amplitude, the signal being emitted from the radar sensor as a radar beam having a fixed angle of incidence with respect to the vertical;
   (b) if an object intersects the radar beam and has as speed component in the direction of the radar beam, using the radar sensor to receive part of a signal reflected by the object, the signal reflected by the object being shifted in frequency with respect to the signal emitted by the radar sensor due to the Doppler effect;
   (c) mixing the emitted signal and the reflected signal in the radar sensor to provide a first output signal at the difference frequency;
   (d) conveying the first output signal to an evaluation unit using a transmission circuit which connects the radar sensor to the evaluation unit, the evaluation unit including lowpass filter means for avoiding spectral aliasing, the lowpass filter means receiving the first output signal, a signal processing unit, and an analog/digital converter connected between the lowpass filter means and the signal processing unit;
   (e) using the signal processing unit to detect the beginning and end of the first output signal, by determining the energy of the first output signal occurring in a window which shifts over time, and by comparing the determined energy with first and second threshold values, the first time the determined energy exceeds the first threshold value identifying the beginning of the first output signal and the time thereafter when the determined energy falls below the second threshold value identifying the end of the first output signal;
   (f) using the signal processing unit to form the frequency spectrum of the first output signal;
   (g) determining the frequency at the maximum amplitude in the frequency spectrum; and
   (h) deriving the speed of the object from at least one parameter, the at least one parameter including the frequency determined in step (f).

2. The method of claim 1, wherein brief excursions of the determined energy below the second threshold level within a predetermined time period are ignored while the end of the first output signal is being identified.

3. The method of claim 1, wherein the first output signal has an average noise level, and wherein the magnitudes of the first and second threshold values are adapted to the existing average noise level.

4. The method of claim 1, wherein the magnitudes of the first and second threshold values are selected to be different.

5. The method of claim 1, further comprising the step of using the signal processing unit to determine the length of the object from the speed derived in step (g) and from the duration of the first output signal.

6. The method of claim 5, wherein the radar beam provides a radar spot in the direction of movement of the object, and wherein the step of using the signal processing unit to determine the length of the object is accomplished by determining the length of the object from the speed derived in step (g), from the duration of the first output signal, and from the expanse of the radar spot in the direction of movement of the object.

7. The method of claim 5, wherein the step of using the signal processing unit to determine the length of the object further comprises reducing errors in the determination of the length of the object due to shading by a correction value which has been statistically determined on the basis of measurements of a plurality of objects.

8. An apparatus for locally compiling and evaluating traffic data, comprising:
   radar sensor means for emitting a continuous signal at a constant frequency and amplitude, the signal being emitted as a radar beam having a fixed angle of incidence with respect to the vertical, the radar sensor means additionally including means for receiving part of a signal reflected by an object if the object intersects the radar beam and has a speed component in the direction of the radar beam, the signal reflected by the object being shifted in frequency with respect to the emitted signal due to the Doppler effect, the radar sensor means further including means for mixing the emitted signal and the reflected signal to provide a first output signal at the difference frequency, the radar sensor means being mounted at predetermined height;
   a transmission circuit connected to the radar sensor means to convey the first output signal; and
   evaluation unit means, connected to the transmission circuit, for forming the frequency spectrum of the first output signal, for determining the frequency at the maximum amplitude in the frequency spectrum, and for deriving the speed of the object from at least one parameter, the at least one parameter including the frequency at the maximum in the frequency spectrum, the evaluation unit means including lowpass filter means for avoiding spectral aliasing, the lowpass filter means receiving the first output signal, a variable gain amplifier connected to the lowpass filter means, the gain of the amplifier being set in dependence on the predetermined height of the radar sensor means, a signal processing unit, and an analog/digital converter connected between the variable gain amplifier and the signal processing unit.

9. The apparatus of claim 8, wherein the lowpass filter means in the evaluation unit means is a digital filter.

10. The apparatus of claim 9, wherein the digital filter is a switch/capacitor filter.

11. The apparatus of claim 8, wherein the signal processing unit comprises means for compensating for any deviation between the fixed angle of incidence of the radar beam and a predetermined angle of incidence.

12. A method of locally compiling and evaluating traffic data, comprising the steps of:
   (a) using a radar sensor to emit a continuous signal at a constant frequency and amplitude, the signal being emitted from the radar sensor as a radar beam having a fixed angle of incidence with respect to the vertical;
   (b) if an object intersects the radar beam and has as speed component in the direction of the radar beam, using the radar sensor to receive part of a signal reflected by the object, the signal reflected by the object being shifted in frequency with respect to the signal emitted by the radar sensor due to the Doppler effect, the object having object-specific features;
   (c) mixing the emitted signal and the reflected signal in the radar sensor to provide a first output signal at the difference frequency;
   (d) conveying the first output signal to an evaluation unit using a transmission circuit which connects the radar sensor to the evaluation unit, the evaluation unit including lowpass filter means for avoiding spectral aliasing, the lowpass filter means receiving the first output signal, a signal processing unit, and an analog/digital converter connected between the lowpass filter means and the signal processing unit;
   (e) using the signal processing unit to form the frequency spectrum of the first output signal;
   (f) determining the frequency at the maximum amplitude in the frequency spectrum;
   (g) deriving the speed of the object from at least one parameter, the at least one parameter including the frequency determined in step (f); and
   (h) reducing the number of errors that may occur due to clutter by checking the first output signal with the aid of a predetermined sampling scheme for the existence of object-specific features, and by comparing the result of the checking with predetermined values to determine whether the first output signal was caused by clutter or by an object participating in the traffic.

13. The method of claim 12, wherein step (e) is conducted by autocorrelation of the first output signal and subsequent spectral transformation.

14. The method of claim 12, wherein step (e) is conducted by relay correlation of the first output signal and subsequent spectral transformation.

15. The method of claim 12, wherein step (e) is conducted by direct spectral transformation of the first output signal.

16. The method of claim 15, wherein the direct spectral transformation is accomplished using a discrete Fourier transformation.

17. The method of claim 15, wherein the direct spectral transformation is accomplished using the fast Fourier transformation method.

18. The method of claim 12, wherein the object moves at a speed within a predetermined expected range, wherein the lowpass filter means has a cut-off frequency, wherein the analog/digital converter has a sampling rate, and further comprising the step of adapting the cut-off frequency and sampling rate to the predetermined expected range of the speed.

19. The method of claim 12, wherein the at least one parameter of step (g) additionally includes the fixed angle of step (a).

20. The method of claim 12, wherein step (c) further comprises generating a second output signal having a phase position that is a function of the direction of movement of the object, and wherein the method further comprises the steps of comparing the phase positions of the first and second output signals for each period of the first and second output signals, coding the result of the comparing step for each period of the first and second output signals with a bit, and using the signal processing unit to derive the direction of movement of the object from a succession of bits.

21. An apparatus for locally compiling and evaluating traffic data, comprising:
radar sensor means for emitting a continuous signal at a constant frequency and amplitude, the signal being emitted as a radar beam having a fixed angle of incidence with respect to the vertical, the radar sensor means additionally including means for receiving part of a signal reflected by an object if the object intersects the radar beam and has a speed component in the direction of the radar beam, the signal reflected by the object being shifted in frequency with respect to the emitted signal due to the Doppler effect, the radar sensor means further including means for mixing the emitted signal and the reflected signal to provide a first output signal at the difference frequency;
a transmission circuit connected to the radar sensor means to convey the first output signal; and
evaluation unit means, connected to the transmission circuit, for forming the frequency spectrum of the first output signal, for determining the frequency at the maximum amplitude in the frequency spectrum, and for deriving the speed of the object from at least one parameter, the at least one parameter including the frequency at the maximum in the frequency spectrum, the evaluation unit means including lowpass filter means for avoiding spectral aliasing, the lowpass filter means receiving the first output signal, a signal processing unit, and an analog/digital converter connected between the lowpass filter means and the signal processing unit, wherein the signal processing unit includes clock pulse generator means for generating a test signal at predetermined time intervals, means for detecting errors in the test signal, and alarm generator means for reporting detected errors in the test signal.

22. The apparatus of claim 21, further comprising solar cell array means for furnishing power to operate the radar sensor means.

23. The apparatus of claim 21, wherein the radar sensor means, transmission circuit, and evaluation circuit means are employed in a local, autonomous system for at least one of traffic detecting, guidance, and control.

24. A method of locally compiling and evaluating traffic data, comprising the steps of:
(a) using a radar sensor to emit a continuous signal at a constant frequency and amplitude, the signal being emitted from the radar sensor as a radar beam having a fixed angle of incidence with respect to the vertical;
(b) if an object intersects the radar beam and has as speed component in the direction of the radar beam, using the radar sensor to receive part of a signal reflected by the object, the signal reflected by the object being shifted in frequency with respect to the signal emitted by the radar sensor due to the Doppler effect;
(c) mixing the emitted signal and the reflected signal in the radar sensor to provide a first output signal at the difference frequency;
(d) conveying the first output signal to an evaluation unit using a transmission circuit which connects the radar sensor to the evaluation unit, the evaluation unit including lowpass filter means for avoiding spectral aliasing, the lowpass filter means receiving the first output signal, a signal processing unit, and an analog/digital converter connected between the lowpass filter means and the signal processing unit;
(e) using the signal processing unit to form the frequency spectrum of the first output signal;
(f) determining the frequency at the maximum amplitude in the frequency spectrum;
(g) deriving the speed of the object from at least one parameter, the at least one parameter including the frequency determined by step (f); and
(h) using the signal processing unit to monitor the functionability of the evaluation unit by periodically feeding a test signal into the lowpass filter means instead of the first output signal, the test signal having a predetermined frequency, amplitude, and duration.

25. The method of claim 24, further comprising the step of using the signal processing unit to classify objects according to length.

26. The method of claim 25, further comprising the step of using the signal processing unit to classify objects according to the amplitude of the respective first output signal.

27. The method of claim 24, further comprising the step of using the signal processing unit to classify objects according to the amplitude of the respective first output signal.

28. An apparatus for locally compiling and evaluating traffic data, comprising:
radar sensor means for emitting a continuous signal at a constant frequency and amplitude, the signal being emitted as a radar beam having a fixed angle of incidence with respect to the vertical, the radar sensor means additionally including means for receiving part of a signal reflected by an object if the object intersects the radar beam and has a speed component in the direction of the radar beam, the signal reflected by the object being shifted in frequency with respect to the emitted signal due to the Doppler effect, the radar sensor means further including means for mixing the emitted signal and the reflected signal to provide a first output signal at the difference frequency;
a transmission circuit connected to the radar sensor means to convey the first output signal; and
evaluation unit means, connected to the transmission circuit, for forming the frequency spectrum of the first output signal, for determining the frequency at the maximum amplitude in the frequency spectrum, and for deriving the speed of the object from at least one parameter, the at least one parameter including the frequency at the maximum in the frequency spectrum, the evaluation unit means including lowpass filter means for avoiding spectral aliasing, the lowpass filter means receiving the first output signal, a signal processing unit, and an analog/digital converter connected between the lowpass filter means and the signal processing unit, wherein the transmission circuit includes a remote end circuit portion which is disposed adjacent the radar sensor means and which includes means for superimposing a pilot tone on the first output signal if the noise level at the output of the radar sensor means exceeds a predetermined threshold level, and wherein the transmission circuit additionally includes a near end circuit portion which is disposed adjacent the evaluation unit and which includes means for detecting the presence of the pilot tone and for generating a detection signal that is conveyed to the evaluation unit means.

29. The apparatus of claim 28, wherein the transmission circuit further comprises means for transmitting energy to operate the radar sensor means.

30. The apparatus of claim 28, wherein the transmission circuit further comprises a transmission cable having a length up to about one to two kilometers.

31. The apparatus of claim 28, wherein the transmission circuit further comprises a transmission cable having a length that is greater than about one kilometer.

* * * * *